Figure 1:
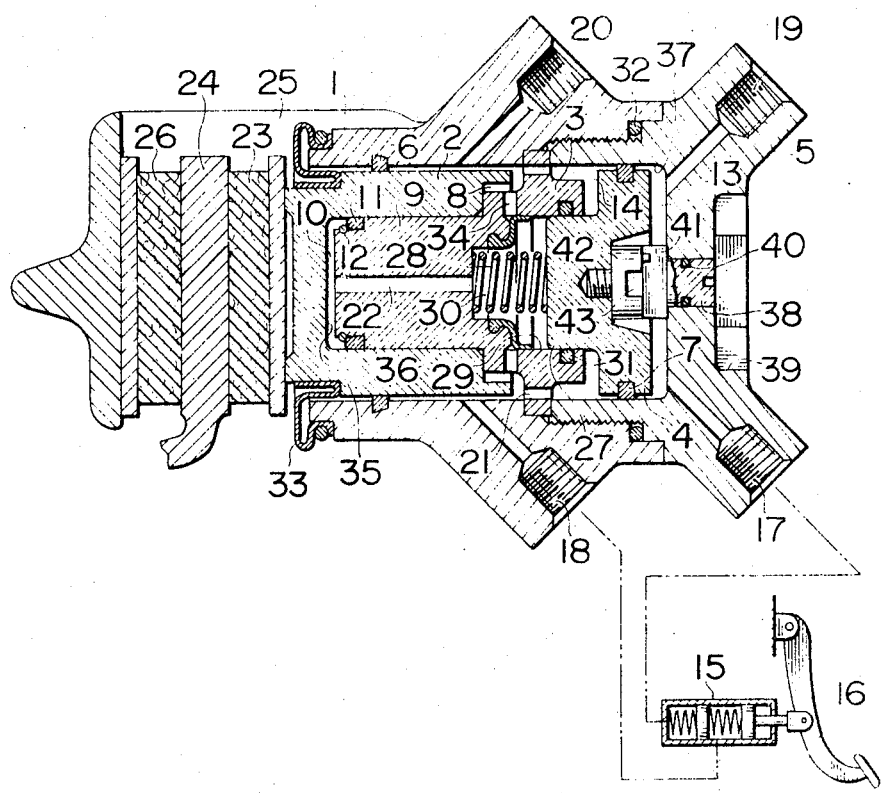

United States Patent

Irie et al.

[15] 3,667,576
[45] June 6, 1972

[54] HYDRAULIC PRESSURE ACTUATED PRESSING DEVICE FOR DISC BRAKE

[72] Inventors: Tadasu Irie, Toyonaka; Kaname Doi, Ibaragi, both of Japan

[73] Assignee: Sumitomo Electric Industries Ltd., Osaka, Japan

[22] Filed: Jan. 27, 1971

[21] Appl. No.: 110,237

[30] Foreign Application Priority Data

Jan. 29, 1970 Japan....................................45/8180

[52] U.S. Cl...........................................188/345, 188/106 P
[51] Int. Cl........................................................B60l 11/20
[58] Field of Search...................188/73, 106, 152, 345, 347, 188/370; 92/62, 108

[56] References Cited

UNITED STATES PATENTS

| | | | |
|---|---|---|---|
| 3,404,756 | 10/1968 | Swift | 188/106 F |
| 3,520,385 | 7/1970 | Huffman et al. | 188/345 |
| 3,371,753 | 3/1968 | Meier | 188/347 |

*Primary Examiner*—Evon C. Blunk
*Assistant Examiner*—Johnny D. Cherry
*Attorney*—William D. Hall, Elliott I. Pollock, Fred C. Philpitt, George Vande Sande, Charles F. Steininger and Robert R. Priddy

[57] ABSTRACT

A hydraulic pressure actuated pressing device for disc brake to compensate the wear of friction pads and to keep the braking clearance constant. A piston of the pressing device has a liquid chamber inside thereof containing a quantity of liquid so that a proper braking cleance is maintained in accordance with the increase of the wear of friction pads while preventing the piston from being retracted even when the hydraulic braking pressure is lost.

2 Claims, 3 Drawing Figures

INVENTORS
Tadasu Irie
Kaname Doi

BY

ATTORNEY

HYDRAULIC PRESSURE ACTUATED PRESSING DEVICE FOR DISC BRAKE

This invention relates to a disc brake, and in particular to improvements in a hydraulic pressure actuated pressing device for pressing friction pads against a rotary disc to thereby brake the disc. Heretofore, when the friction pads have worn out, various mechanisms for compensating the wear of pads and for keeping the distance of engagement of the friction pads with the rotary disc or braking clearance constant were incorporated into the hydraulic pressure actuated pressing device but they were complicated and relatively weak in strength.

This invention is intended to compensate the wear of friction pads and to keep the distance of engagement of the friction pads with the rotary disc or braking clearance constant by providing a liquid chamber inside of a piston for pressing the friction pads against the brake disc while maintaining a suitable quantity of liquid in the liquid chamber regardless of expansion of the liquid chamber caused in accordance with the wear of the friction pads and by preventing the piston from being retracted even when hydraulic braking pressure is lost.

Furthermore, this invention provides a hydraulic pressure actuated pressing device adaped to be operated by two separate hydraulic braking systems, said device being designed to operate with the same pressing force as was available before the failure of one the hydraulic braking systems, by using the other braking hydraulic pressure system even when the supply of hydraulic pressure is discontinued due to the failure of one of braking hydraulic pressure systems. This can be achieved simply and effectively by the aforesaid hydraulic wear compensation device.

According to this invention, there is provided a hydraulic pressure actuated pressing device for a disc brake having a rotary disc, at least one pair of friction pads adapted to be brought into engagement with the opposite surfaces of the disc, wherein said device comprises a cylinder adapted to be supplied with hydraulic braking pressure and a piston received in said cylinder and slidable liquid-tightly on the inner wall thereof, a fixed partition wall member fixedly secured to said cylinder and having a fixed projecting portion projecting towards said disc and a cavity provided on the side remote from said disc, said piston having a cavity concentrically bored therein and receiving therein said fixed projecting portion in slidable relationship with the outer circumferential surface thereof, a floating partition wall member received in said cylinder and having a floating projecting portion slidable liquid-tightly within said cavity of the fixed partition wall member and a sliding partition wall slidable liquid-tightly on the inner wall of said cylinder, a first liquid chamber defined by said cavity of the fixed partition wall member and said floating projecting portion, a second liquid chamber defined by said cavity of the piston and said fixed projecting portion, said first and second liquid chambers communicating with each other through a passageway bored through said fixed projecting portion, and an annular liquid chamber defined by the inner wall of said cylinder and said fixed partition wall member, said first liquid chamber being connected with said annular liquid chamber through valve means, said valve means transmitting the hydraulic pressure of said annular liquid chamber to said first liquid chamber when the hydraulic pressure of the annular liquid chamber is supplied from a first hydraulic braking system in a higher state than that of the first liquid chamber, said piston acting to press at least the friction pad disposed on one side of said disc against said disc by the first hydraulic braking pressure supplied to said annular liquid chamber a nd the hydraulic pressure supplied to the second liquid chamber.

Furthermore, according to this invention, in a hydraulic pressure actuated pressing device as stated above, a hydraulic braking pressure from a second hydraulic braking system is supplied to a third liquid chamber defined by the floating partition wall member and the bottom of the cylinder. This has the following advantages.

When the supply of the hydraulic braking pressure from the first hydraulic braking system has ceased, the floating partition wall member is moved to the left to advance into the first liquid chamber by means of second hydraulic braking pressure thereby the hydraulic pressure within the second liquid chamber may be raised due to the fact that the second hydraulic braking pressure increased according to substantially the ratio of the diametrical sectional area of the third liquid chamber to the first liquid chamber is applied to the second liquid chamber.

Figure 2:
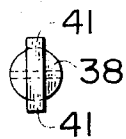
Figure 3:
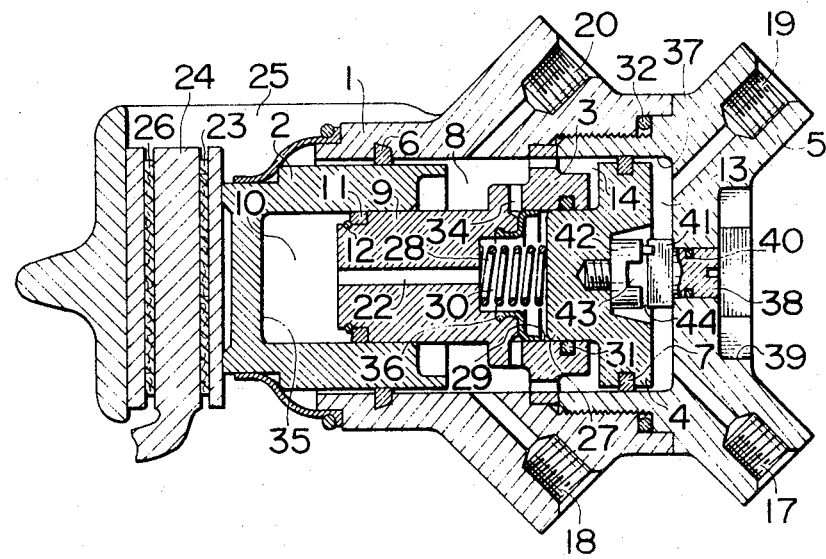

The characteristic features of the invention will become more apparent from the following description of an embodiment made with reference to the accompanying drawings in which:

FIGS. 1 and 3 are sectional views of a hydraulic pressure actuated pressing device for a disc brake showing an embodiment of this invention, FIG. 1 showing the state in which friction pads pressed against a rotary disc for braking the disc have not worn out, and FIG. 3 showing the state of the pads having worn out; and FIG. 2 is an explanatory view of a stopper for preventing a floating partition wall member used in the embodiment in FIGS. 1 and 3 from moving to the side opposite to the rotary disc.

The embodiment shown in FIG. 1 is an example of application of a compensation device for the wear of friction pads according to the present invention to a floating type disc brake that is operated by a single piston-cylinder unit. Specifically, it is an example of application of the compensation device for the wear of friction pads to a disc brake of the type constructed in such a manner that a cylinder 1 having a hydraulic pressure actuated pressing mechanism therein is disposed on one side of a disc 24 and an arm 25 which extends from the cylinder across the disc and that not only a friction pad 23 disposed on one side of the disc is pressed against the associated surface of the disc 24 by a piston in the cylinder 1 driven by hydraulic pressure but also another friction pad 26 disposed on the opposite side of the disc is pressed against the associated surface of the disc through said arm 25 by the cylinder 1 being moved away from the disc 24 by the reaction applied to the cylinder. The cylinder 1 is open at one end facing the disc 24 and is closed at the other end by a cylinder bottom 5 screwed into the cylinder 1 and is sealed liquid-tightly by a seal 32 interposed therebetween. The cylinder 1 contains therein the piston 2, and a partition wall member 3 fixedly securred to the cylinder and a floating partition wall member 4 which are arranged to the right of the piston 2 as viewed in FIG. 1. (Hereinafter, it should be understood that the terms "left" and "right" refer to the direction of the parts as viewed in FIGS. 1 and 2.)

The piston 2 is slidably fitted into the cylinder and liquid-tightly sealed by a seal 6 disposed on the inner surface of the cylinder 1.

The fixed partition wall member 3 is fixed to the cylinder 1 together with the cylinder bottom member 5 by screwing the latter into the cylinder 1, and an annular liquid chamber 8 is defined between a part of the inner surface of the piston 2 and a part of the outer surface of the fixed partition wall member 3. This wall member 3 is formed at the center thereof with a fixed projecting portion which is loosely fitted into a cavity 35 formed in the center of the piston and defines a second liquid chamber 10 between the forward end of the projecting portion and the bottom of the cavity of the piston. A cap seal 11 is disposed between the fixed projecting portion 9 and the piston cavity 35 and retained by an O-ring 12 mounted on the end concentrically the projecting portion 9 so as to prevent the transmission of hydraulic pressure from the second liquid chamber 10 to the annular liquid chamber 8 and also to prevent the leakage of liquid. Furthermore, a liquid chamber 14 and a first liquid chamber 30 are defined between the floating partition wall member 4 and the fixed partition wall member 3, and passageways 21 and 34 leading to the chambers 14 and 30 are provided in the fixed partition wall member 3. The floating partition wall member 4 has the same outer diameter as the piston 2 and is fitted concentrically with the piston 2 into the cavity 37 formed in the cylinder bottom 5 and sealed liquid-tightly by a seal 7. The central portion of the floating partition wall member 4 projects to the left so as to form a floating projecting portion 27, which is equal in outer diameter to the fixed projecting portion 9 of the fixed partition wall member 3. The floating projecting portion 27 is loosely fitted into a cavity 29 concentrically formed on the right-hand side of the fixed partition wall member 3 and is liquid-tightly sealed by an O-ring 31 disposed in the cavity 29. The part of the projecting portion 27 extending beyond the position of the O-ring 31 is set to a predetermined small distance. Thus, the floating partition wall member 4 defines an annular liquid chamber 14 and a cylindrical first liquid chamber 30 in cooperation with the fixed partition wall member 3 therebetween. The annular liquid chamber 14 is brought, through the passageway 21 of said partition wall member 3, into communication with the annular liquid chamber 8, and the first liquid chamber 30 leads to the annular liquid chamber 8 through the passageway 34 of the fixed partition wall member 3 with a cap seal 36 interposed between the first chamber 30 and the passageway 34. A communication is also established between the first liquid chamber 30 and the second liquid chamber 10 provided inwardly of the forward end of the piston 2 through a passageway 22 bored throughout the fixed projecting portion 9 of the fixed partition wall member 3 along the axis thereof. The cap seal 36 provided in the first liquid chamber 30 is made of flexible material such as rubber or the like and has a central hole leading to the passage 22. This seal is tightly connected at the peripheral edge of one end thereof to the front end surface of the cavity 29 and is tightly connected at the peripheral edge of the other end thereof to the inner wall of the cavity 29 in close contact relation with the surface of the inner wall, thereby the transmission of hydraulic pressure from the first liquid chamber 30 to the annular liquid chamber 8 and the leakage of liquid are prevented.

Furthermore, a spring 28 is loaded between the floating partition wall member 4 and the fixed partition wall member 3, but the repulsive force of the spring is near zero so that the forward end of the floating projecting portion 27 extends beyond the position of the O-ring 31 to thereby be liquid-tightly sealed. The spring constant of the spring 28 is designed to be relatively large.

The floating partition wall member 4 defines on the right-hand side thereof a third liquid chamber 13 in cooperation with the cylinder bottom 5 between the end surface of the cavity 37 of the cylinder bottom and the back surface of the floating partition wall member 4. A stopper 38 is disposed between the floating partition wall member 4 and the cylinder bottom 5 at the center thereof while being kept liquid-tightly sealed by an O-ring 40 mounted on a shank of the stopper extending through an opening of the cylinder bottom, and prevents the contact of the end surface of the cavity 37 of the cylinder bottom 5 with the floating partition wall member 4. The gap between the floating partition wall member 4 and the cavity 37 is set to be somewhat larger than the afore-mentioned distance which the central projecting portion 27 of the floating partition wall member 4 extends beyond the position of the O-ring 31. Projections 41 as shown in FIG. 2 are provided at the left end of the stopper 38, and the projections 41 are kept in contact with the head of a bolt 42 screwed into a threaded hole provided on the right-hand side of the floating partition wall member 4 at the center thereof.

The bolt 42 is provided with a groove 43 large enough for the projections 41 to be fitted therein. The cylinder is provided with an inlet 18 for a first braking hydraulic pressure system which introduces the liquid from one chamber of a master cylinder 15 and which is opened to the annular liquid chamber 8.

Furthermore, an air vent plug 20 for air evacuation is opened to the annular liquid chamber 8 to completely evacuate the remaining gas in the annular liquid chamber 8 and liquid chamber 14. In this case, no air evacuation is required by fully filling the second liquid chamber 10, passageway 22, and first liquid chamber 30 with the liquid before assembling. Also, the cylinder bottom 5 is provided with an inlet 17 for a second braking hydraulic pressure system which introduces the liquid from the other chamber of the master cylinder and which is opened to the third liquid chamber 13 and also an air vent plug 19 for evacuating the remaining gas in the third liquid chamber 13 is opened to the chamber 13. On the opening end on the disc side of the cylinder 1 is disposed a dust cover 33 bridging the cylinder 1 and the piston 2 so as to prevent harmful substances from entering the fitting portion between the cylinder 1 and the piston 2. A hexagonal cavity 39 formed on the cylinder bottom 5 is a meshing recess for receiving a tool by the use of which the cylinder bottom 5 is screwed into the cylinder 1.

Now, a description will be made on the operation of the embodiment of the invention.

Suppose that, when a brake pedal 16 is worked in braking, hydraulic pressure $P_1$ and $P_2$ are produced in two chambers of the tandem master cylinder 15. Normally, $P_1 = P_2 = P$. Hydraulic pressure $P_2$ of a second braking hydraulic pressure system is led from an inlet port 17 of the cylinder bottom 5 to the third liquid chamber 13 and applies force $P_1 A$ to the surface on the right-hand side of the floating partition wall member 4 and to the end surface of the cavity 37 of the cylinder bottom 5. Here the character A represents a diametrical sectional area of the third liquid chamber 13.

On the other hand, hydraulic pressure $P_1$ of a first braking hydraulic pressure system is led from an inlet 18 of the cylinder 1 to the annular liquid chamber 8 and then through a passageway 21 formed in the fixed partition wall member 3 to the liquid chamber 14. This hydraulic pressure works on the respective annular surfaces of the piston 2 and the floating partition wall member 4 and imparts force $P_1(A - B)$ to the piston 2 in the left direction and to the floating partition wall member 4 in the right direction. Here the character B represents the diameterical sectional areas of the first liquid chamber 30 and the second liquid chamber 10. Thus, the floating partition wall member 4 is subjected to force $P_2 A$ from the right-hand side and to force $P_1(A - B)$ from the left-hand side, and is moved to the left by force in terms of a difference $P_2 A - P_1(A - B)$ between the two forces and compresses the spring 28, whereby the floating partition wall member 4 presses the liquid that is filled within the first liquid chamber 30, passageway 22, and second liquid chamber 10 to raise the pressure of the liquid, while being subjected to the repulsive force of the spring. Suppose that the hydraulic pressure presenting within the first liquid chamber 30, passageway 22, and second liquid chamber 10 (said hydraulic pressure is hereinafter referred to as the inner pressure of piston) is $P_3$, the setting load of spring 28 is $S_{10}$, spring constant is $\beta_1$, and the distance of movement of the floating partition wall member 4 from its normal position to the left is $\delta_1$, then the following equation is obtained.

$$P_3 B + S_{10} + \beta_1 \delta_1 = P_2 A - P_1(A - B)$$

if $$P_1 = P_2 = P,$$

then $$P_3 B + S_{10} + \beta_1 \delta_1 = PB$$
$$P_3 = P - (S_{10} + \beta_1 \delta_1)/B$$

As previously described, $S_{10}$ is near zero and $\delta_1$ is also usually very small, and hence, a pressure differential between $P_3$ and $P_1$ is small. Since this pressure differential is smaller than the critical pressure differential $\Delta P$ under which the pressure within the annular liquid chamber 8 presses a cap seal 36 through a passageway 34 and becomes to be transmitted to the first chamber 30, no transmission of the liquid pressure from the annular liquid chamber 8 to the first chamber 30 is established.

However, when the wear of the pads increases and accordingly the leftward movement of the piston becomes great, the distance of movement $\delta_1$ of the floating partition wall member 4 also becomes great, and hence the pressure differential between $P_3$ and $P_1$ becomes greater than $\Delta P$ with the result that the pressurized liquid led through the passageway 34 presses against the cap seal 36 to deform it and is introduced into the space produced between the outer surface of — cap seal 36 and the part of the wall surface of the first liquid chamber which had been in close contact relation with the outer surface of the cap seal until it was deformed, whereby a part of the space of the first liquid chamber is occupied by the liquid introduced from the passageway 34. Thus, the pressure of the liquid within the first liquid chamber is raised until the pressure differential between $P_1$ and $P_3$ decreases below the critical pressure differential $\Delta P$. Thus, force near $P(A - B)$ is imparted to the piston in the annular liquid chamber 8, and force near PB is imparted to the piston in the second liquid chamber 10, and this results in that the pad 23 is pressed against the disc 24 by the force approximate to PA, while on the other hand, the cylinder 1 is subjected on the bottom thereof to force $P_2A$ or PA which draws an arm 25 to the right and presses the pad 26 against the other surface of the disc 24, with the result that the disc 24 is subject to the force PA from both sides to be braked.

Furthermore, when the piston is moved leftward due to the wear of the pads as described above, the first liquid chamber 30 is connected with the annular liquid chamber 8 with the flexible cap seal 36 interposed therebetween. Therefore, the liquid that served the purpose of increasing the volume of the second liquid chamber 10 as shown in FIG. 3 is surely refilled. When the friction pads 23 and 26 for the brake that has normally worked have worn to their limit of use due to their long time use, it becomes necessary to replace them with new ones by pushing back the piston.

In such a case, when air vent plugs 19 and 20 are loosened, a stopper 38 is rotated through the angle of 90° from outside so as to fit its projections 41 loosely into a groove 43, and then the piston 2 is pushed back into the cylinder 1 by the use of a suitable tool, the liquid that is sealed within the piston is increased in pressure and presses against the floating partition wall member 4 at the formed end of the floating projection portion 27 thereof so as to push it rightwardly.

When the rightward movement of the floating partition wall member 4 has progressed until the floating projecting portion 27 reaches a position at which the forward end thereof leaves an O-ring 31, the liquid sealed within the piston flows out from the first liquid chamber 30 through the liquid chamber 14, the passageway 21, the annular liquid chamber 8 and finally flows out from the air vent plug 20. Accordingly, the piston 2 is released from suppression with respect to the fixed partition wall member 3 and is still further pushed back.

As may be understood from the above description, the volume of the second liquid chamber 10 expands in proportion to the wear of the friction pad 23, but the liquid in the second liquid chamber 10 is prevented from flowing by the provision of the cap seal 36 serving as a check valve and the amount of the liquid is constantly kept in the chamber and the piston is kept in the position to which it is moved forward in proportion to the wear of the friction pad 23, thus positively compensating for the wear of the friction pad.

Now, a description will be made on the case in which either of the two hydraulic pressure circuits $P_1$ and $P_2$ has gone wrong in this braking system. Suppose that a second braking hydraulic pressure system is out of order and has ceased to supply braking hydraulic pressure. As the hydraulic pressure to be transmitted from the inlet 17 to the third liquid chamber 13 disappears, force $P_2A$ to push the cylinder bottom rightwardly disappears but at the same time the force to push the floating partition wall member 4 also disappears.

On the other hand, the pressure of the circuit $P_1$ is transmitted by the inlet 18 from the annular liquid chamber 8 through the passageway 21 to the liquid chamber 14 and also through the passageway 34 to the first liquid chamber 30 by pushing the cap seal 36, and accordingly force $P_1A$ is applied both to the piston 2 and to the floating partition wall member 4. In this case, as shown in FIG. 3, the head of the bolt 42 screwed into the floating partition wall member 4 may sometimes have a slight gap 44 left with respect to the projections 41 of the stopper 38 until hydraulic pressure $P_2$ disappears, but a decrease in hydraulic pressure $P_2$ brings the head of the bolt 42 into contact with the projections 41 of the stopper 38 thereby preventing the excessive rightward movement of the floating partition wall member 4, with the result that there is no need of supply of additional amount of liquid from the first braking hydraulic pressure system. Thus, both frictional pads 23 and 26 are enable to apply the brake by sandwiching the disc 24 from both sides with force $P_1A$ in the same manner as in the case that both hydraulic pressure circuits are in the normal condition.

Conversely, when the circuit $P_1$ has failed, only the hydraulic pressure $P_2$ from an inlet 17 works on the liquid chamber 13. In such a case, force $P_2A$ is applied to the bottom surface of the cavity 37 of the cylinder bottom 5, and the friction pad 26 on the opposite side is pressed through the arm 25 against the disc by force $P_2A$. At the same time the floating partition wall member 4 is pushed leftwardly by force $P_2A$ and after only slight movement of the floating partition wall member 4 corresponding to the degree of compression of the pad and the deformation of the arm (in this case the wear of the pads is compensated for by the liquid refilled as the wear increases), the liquid sealed within the piston is pressed by the floating projecting portion 27 of the floating partition wall member 4 and the pressure of the liquid is thus raised.

Now suppose the pressure of the inside of the piston is represented by $P'_3$ and the amount of movement by $'_1$, then the following equation is obtained.

$$P'_3B + S_{10} + \beta_1 \delta'_1 = P_2A$$
$$P'_3B = P_2A - (S_{10} + \beta_1 \delta'_1)$$

Thus the friction pad 23 is pressed against the disc 24 by a force smaller by the amount $(S_{10} + \beta_1 \delta'_1)$ than $P'_3B$ or $P_2A$.

Herein there exists a slight unbalance of force. However, in reality $S_{10} + \beta_1\delta'_1$ is neglible in comparison with $P_2A$ and braking is carried out without hindrance and in the same manner as in the case that both hydraulic pressure circuits are in the normal condition.

As described above, this invention provides a hydraulic pressure actuated pressing device for a disc brake in which the gap produced between a disc and friction pads due to the wear of the pads can be compensated for by storing the brake liquid within the second liquid chamber of the piston, while preventing the brake liquid from flowing out from the second liquid chamber by a cap seal, and which, even if the first hydraulic braking pressure system fails, can function normally by raising the hydraulic pressure of the second liquid chamber by the movement of the floating projecting portion 27 pressed by the second hydraulic braking pressure system in the direction in which the volume of the second liquid chamber is reduced by the movement of the floating projecting portion 27.

Furthermore, the cap seal 36 of the device of the present invention may in other words be termed as a check valve for preventing the flowing out of a braking liquid into the other hydraulic braking pressure system that has become unable to supply hydraulic braking pressure, when one hydraulic pressure actuated pressing device is operated by either one of two hydraulic braking pressure systems.

What we claim is:

1. A hydraulic pressure actuated pressing device for a disc brake having a rotary disc, at least one pair of friction pads adapted to be brought into engagement with the opposite surfaces of the disc, wherein said device comprises a cylinder adapted to be supplied with hydraulic braking pressure and a piston received in said cylinder and slidable liquid-tightly on the inner wall thereof, a fixed partition wall member fixedly secured to said cylinder and having a fixed projecting portion projecting towards said disc and a cavity provided on the side remote from said disc, said piston having a cavity concentrically bored therein and receiving therein said fixed projecting portion in slidable relationship with the outer circumferencial surface thereof, a floating partition wall member received in said cylinder and having a floating projecting portion slidable liquid-tightly within said cavity of the fixed partition wall member and a sliding partition wall slidable liquid-tightly on the inner wall of said cylinder, a first liquid chamber defined by said cavity of the fixed partition wall member and said floating projecting portion, a second liquid chamber defined by said cavity of the piston and said fixed projecting portion, said first and second liquid chambers communicating with each other through a passageway bored through said fixed projecting portion, and an annular liquid chamber defined by the inner wall of said cylinder and said fixed partition wall member, said first liquid chamber being connected with said annular liquid chamber through valve means, said valve means transmitting the hydraulic pressure of said annular liquid chamber to said first liquid chamber when the hydraulic pressure of the annular liquid chamber is supplied from a first hydraulic braking system in a higher state than that of the first liquid chamber, said piston acting to press at least the friction pad disposed on one side of said disc against said disc by the first hydraulic braking pressure supplied to said annular liquid chamber and the hydraulic pressure supplied to the second liquid chamber.

2. A hydraulic pressure actuated pressing device for a disc brake according to claim 1, wherein a hydraulic braking pressure from a second hydraulic braking system is supplied to a third liquid chamber defined by said floating partition wall member and the bottom of the cylinder.

* * * * *